May 5, 1931.  A. C. JENEZON  1,803,903

PARACHUTE

Filed Dec. 17, 1928   3 Sheets-Sheet 1

A. C. Jenezon
Inventor

Gordon & Stewart
Attorneys

May 5, 1931.  A. C. JENEZON  1,803,903
PARACHUTE
Filed Dec. 17, 1928  3 Sheets-Sheet 2
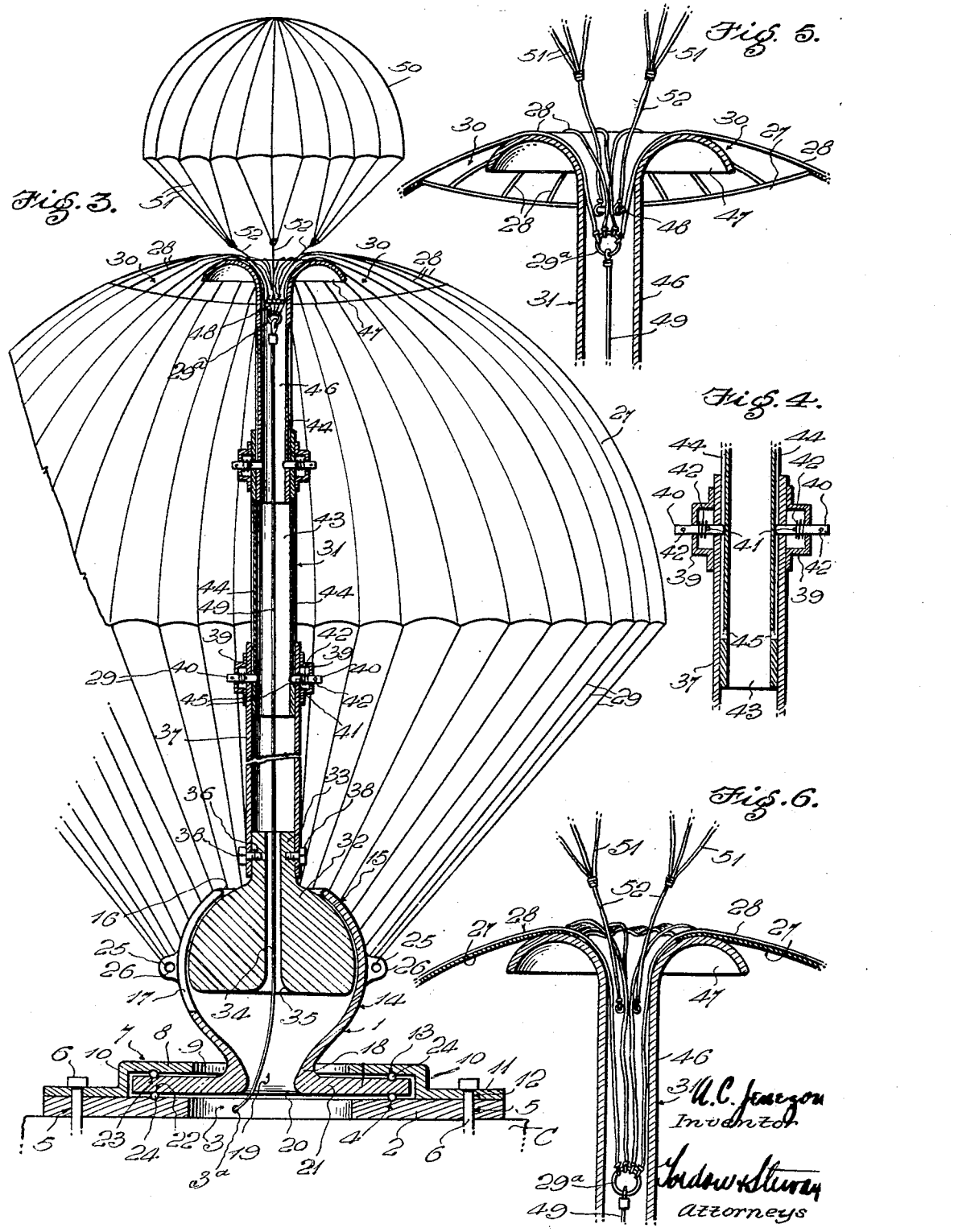

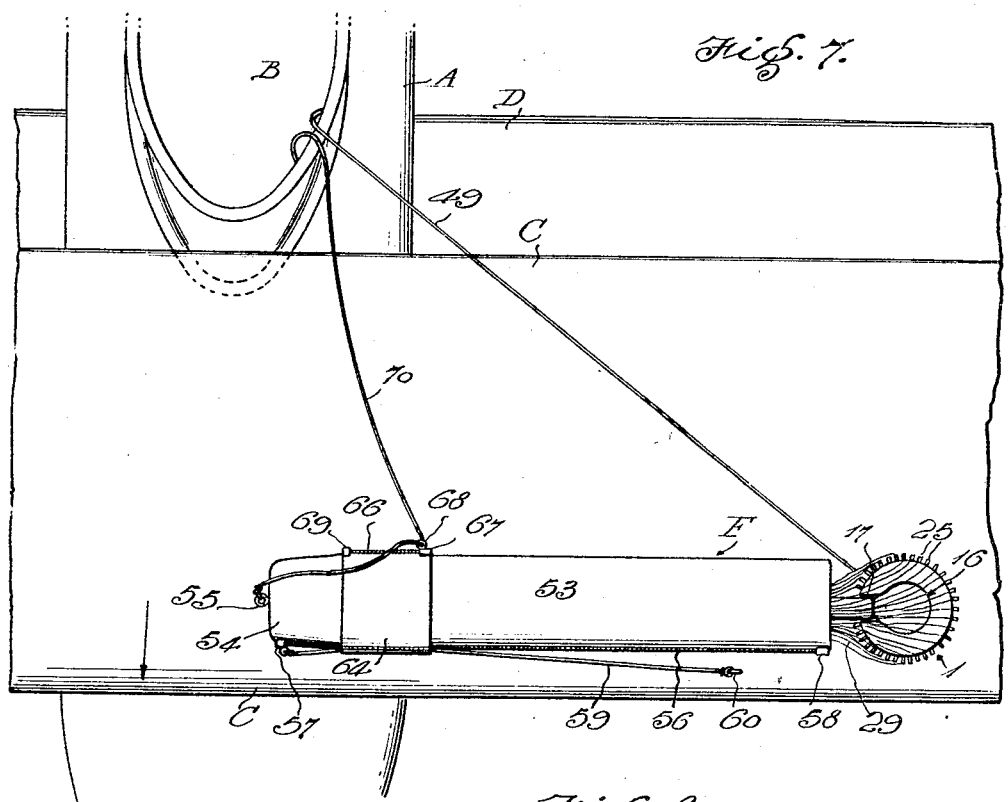
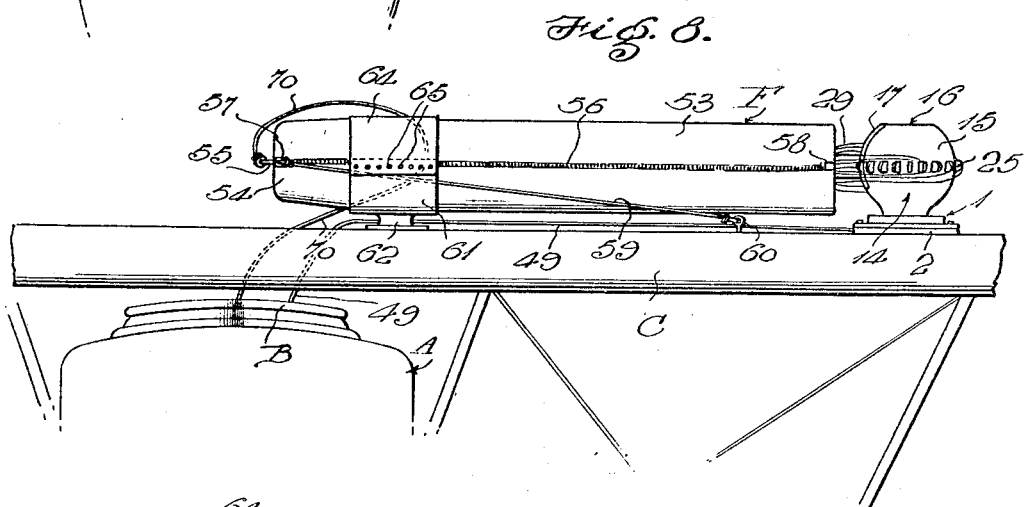
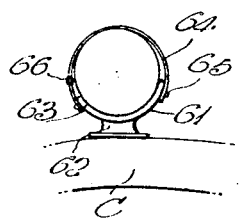

Patented May 5, 1931

1,803,903

UNITED STATES PATENT OFFICE

ALBERT CASPER JENEZON, OF BALTIMORE, MARYLAND

PARACHUTE

Application filed December 17, 1928. Serial No. 326,530.

The present invention relates to a parachute, and particularly to a new and improved form of parachute for attachment to an aircraft, and so constructed and arranged that, in the event of the aircraft's becoming unmanageable the parachute may be allowed to open and check the descent of the aircraft.

An object of my invention is to provide a novel arrangement of parachutes which will tend to prevent the aircraft from spinning during its descent.

Another object of my invention is to provide a new type of telescoping extensible mast for stabilizing said parachute.

Another object of my invention is to provide simple and novel means for quickly extending said mast.

Another object of my invention is to provide an improved form of anchorage on the aircraft for said parachute and said mast.

A further object of my invention is to provide a vent in the top of said parachute and means cooperating with said mast for partially or wholly closing said vent.

Other objects of my invention will become apparent as the specification proceeds.

Fig. 3 is an enlarged vertical view in cross section through the mast and parachute showing the associated parts.

Fig. 4 is a fragmentary vertical section further enlarged of the means for latching the sections of the mast.

Fig. 5 is a view in vertical section of the top portion of the mast, showing the means for attaching the small parachute to the mast, and also the way the reenforcing cords of the large parachute pass downwardly into the mast.

Fig. 6 is a similar view of the top part of the mast showing the inner edge of the large parachute gathered into said top when it is desired to close the vent and also showing modified means of attaching the small parachute.

Fig. 7 is a fragmentary plan view showing the parachute device mounted in closed carrying position on the wing of the plane.

Fig. 8 is a front elevation of the same, and

Fig. 9 is a side elevation of the parachute device as shown in Fig. 8.

Figure 1:
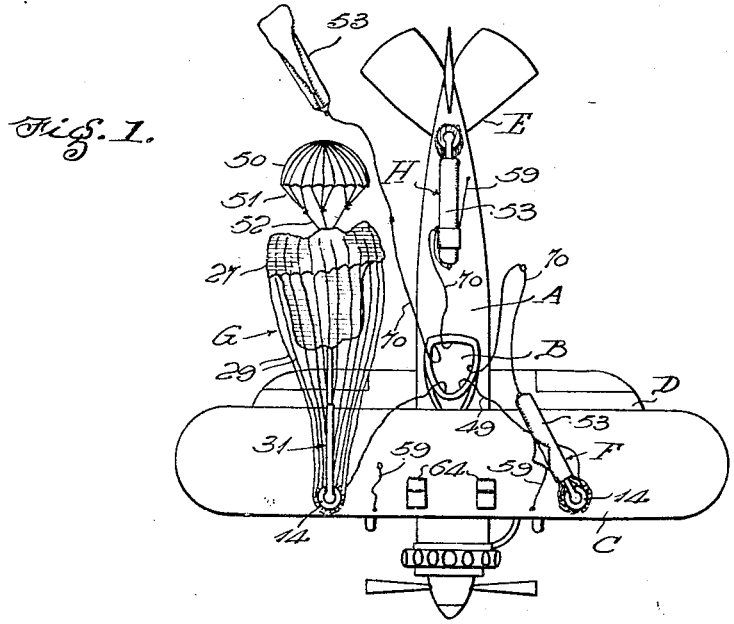
Figure 1 is a vertical elevation of a falling airplane equipped with the improved parachutes.

It will be understood that my parachute is adapted for use on any type of aircraft, such as a dirigible balloon, airplane, glider, or the like, but for convenience in describing and explaining my device I have shown it mounted upon a small airplane having a body portion or fuselage A, a cockpit B, an upper wing C, a lower wing D, and a tail E.

In carrying my invention into practice I provide upon the airplane a plurality of parachutes F, G, H, symmetrically arranged on the airplane, so that when they are in operation they will maintain the airplane approximately in normal flying position.

Since these parachutes are alike in structure and operation, it will not be necessary to describe in detail more than one of them. I will therefor proceed with a description of the parachute marked F in Fig. 1.

As shown in Fig. 3 this parachute has a universal connection denoted generally by the reference character 1, through which it acts to retard the descent of the airplane.

This universal connection includes a base plate 2, on the wing C of the airplane, formed of suitable material, preferably metal, in the form of a disk of substantially uniform thickness and having a central opening 3, and a radial passageway 3a.

On one face of said disk and surrounding said opening is a circular groove 4. A plurality of openings 5 are provided near the edge of said disk for the accommodation of bolts or screws 6, fastened to the wing C.

This base plate cooperates with a collar 7, having a central portion 8 with an opening 9 therein.

Said collar also has an annular rim 10 and a flange 11, all integrally formed therewith or otherwise rigidly connected thereto, and openings 12 are formed in said flange, and registering with the openings 5 in the base plate 2 when said collar is superimposed on said base plate. A circular groove, 13 is formed on the underside of said top portion surrounding said central opening. The structure described thus far constitutes a holding means for supporting a socket member 14 and maintaining it in operative relation with the aircraft.

The said socket member includes a shell 15, substantially spherical in shape having an opening 16 in its top, and a slot 17, leading from said opening down one side of said shell for a purpose which will presently appear.

Said shell also has a hollow neck or extension 18, the opening 19 therein forming a continuation of the interior of the shell, the walls of the opening blending smoothly into the walls of the interior of the shell, and the opening flaring somewhat at its lower extremity as shown at 20.

Formed integrally with said neck, or suitably fastened thereto is a flange 21 having upon its lower face a circular groove 22, and on its upper face a similar groove 23. Said flange extends into the space between the base plate 2, and the collar 7 as clearly shown in Fig. 3, and balls 24 are provided, between grooves 4 and 22 and 13 and 23, respectively to form anti-friction bearings for said shell in said base member.

It will thus be apparent that the shell 14 will be permanently mounted on the airplane wing but freely rotatable thereon.

A plurality of ears 25, having openings 26 therein are provided on the side of said shell 14 for anchoring the parachute cords.

Passing now to the parachute proper, the same consists of a bag or canopy 27 of substantial size made of suitable material such as linen or light canvas, part spherical in form when extended and provided on its upper surface with numerous reenforcing cords 28 extending over the surface of said bag from the center or highest point thereof. These cords are sewed or otherwise secured to the surface of the bag so that they will automatically assume their correct relation with each other whenever the bag is filled. The cords have extensions 29 beyond the periphery of the bag which extensions fasten to the ears 25. At their meeting point in the center of the bag, these cords are fastened to a ring 29a.

The retarding force exerted by the bag is thus communicated to the shell by means of these cords in the most direct manner possible, and through the flange 21 to the collar 7, and thence, through the fastening means 6 to the wing C of the airplane.

It will now be apparent that any tendency to spin on the part of the parachute will be allowed for by the pivotal mounting of the socket in the base member, said socket rotating freely under the influence of the cords 29 urged by the bag 27. Furthermore what little turning force is transmitted to the airplane through the friction in the bearings 24 will be resisted by the other parachutes, since, in order for the plane to spin, the parachutes would necessarily have to be dragged bodily along a spiral path instead of drifting in a straight one, and since their retarding force is exerted in a direction opposite to their path of travel, they would tend to stop the rotation.

This effect would be pronounced if the plane tended to spin during its descent on account of misalignment of wing surfaces such as might occur upon the breaking of a strut or supporting wire. A relatively large opening or vent 30, is left in the center of the bag for a purpose to be presently described.

In order to stabilize the parachute and to aid in controlling the vent 30, a telescoping mast is provided denoted generally by the character 31.

A ball 32 universally rotatable in said shell 15 constitutes the lower extremity of the mast. Said ball has a cylindrical neck 33 extending therefrom and a bore 34 therethrough concentric with said neck, said bore having a widely flared portion at its lower extremity as shown at 35.

Threaded openings 36 are provided in the sides of said neck. A section 37 of tubular form is fitted on said neck 33, and held in place thereon by screws 38 passing through openings in the wall of the tube and threaded into the holes 36.

Caps 39—39 are provided at opposite sides of the upper end of the tube section 37, and plungers 40, 40 are provided slidably fitting in aligned openings in said caps and tube. Each plunger 40 has a pin 41 transversely disposed therein and projecting on either side thereof. A spring 42 bears at one end against said pin, and at its opposite end against the inner wall of the cap, thus urging the said plunger inwardly. The pin 41 serves to limit the travel of the plunger by engaging the outer wall of the tube section 37.

The length of the plunger, and position of the pin is such that, when the pin is in engagement with the tube the plunger will extend into the interior of the tube a distance approximately equal to the thickness of the tube.

A pin 42 is transversely mounted in the outer end of said plunger to serve as a grip for manually retracting said plunger when desired.

Slidably fitted in said tubular section 37, is a tubular section 43, having longitudinal channels 44, 44 on its outer surface. These channels are preferably rectangular in cross section, and may advantageously have a depth of about half the thickness of the tube. At their lower ends the channels run into openings 45, 45 formed in the tube.

This section 43 forms the second or intermediate section of the telescoping mast above referred to. The purpose of the spring actuated plungers will now be apparent. When the mast is in its retracted position, the tube 43 is slid down inside the tube 37 for practically its full length, the plungers bearing at this time against the bottoms of the channels 44, as shown in Fig. 4. As the mast is extended under the influence of the extending means to be later described, the plungers are held retracted by the bottoms of the channels 44, with which they have relative sliding movement, as the section 43 is pulled out. When the mast is fully extended the plungers 40 drop into the openings 45, under the influence of the springs 42, and thus lock the sections 37 and 43 together, so that the latter cannot be retracted without releasing the plungers by means of a deliberate pull on the pins 42.

Adjacent its upper end, section 43 has a plurality of caps having plungers therein identical in form and operation with those on the upper end of section 37. If desirable a plurality of these intermediate sections may be used in the mast. I have shown a mast with only one intermediate section, this being the preferred construction.

Fitted into the top part of the uppermost intermediate section of the mast, in telescoping relation therewith is the tubular section 46. This section 46 is identical in form, insofar as its lower end is concerned with section 43, having channels 44, 44 and openings 45, 45 as above described.

This section, however, has a funnel 47 formed on its upper end. A small cross bar 48 extends across the interior of the tube and is rigidly fastened therein. As is apparent from an inspection of Fig. 5, this cross bar passes between the cords 28, and does not interfere with them in the least.

Passing down through the hollow mast is a cable 49, fastened securely at one end in the ring 29a.

Said cable 49 extends through the passageway 3a to a point in the cockpit where it can be easily manipulated by the pilot.

The length of the cable 49 is such that, when the mast is extended its tension, operating through the ring 29a draws the cords 28 downwardly into the funnel shaped top 47 of the mast, as shown clearly in Figs. 3 and 5.

When it is desired to close the vent 30 a pull on the cable 49 will cause the ring 29a to travel down inside the hollow section 46 and pull the cords 28 after it as shown in Fig. 6 until the edge of the bag adjacent the vent is gathered into the funnel shaped top 47 of the mast.

It is thus apparent that, by properly manipulating the cable 49, the size of the vent can be readily increased or diminished or it can be closed entirely.

It is also evident that the center of the parachute is supported and stabilized by such contact with the mast.

While the mast does stabilize the parachute as set forth, it does not interfere with the free action thereof in the least, because of the ball and socket connection with which it is mounted on the airplane. Sufficient freedom is allowed so that the mast can follow any swaying or gyrating movement of the parachute without reaching the limit of travel allowed by the opening 16.

A small parachute 50 is provided to pull the mast out from collapsed to extended position. The parachute has a series of cords 51 which are gathered together in groups, each group being connected by a cable 52 to the crossbar 48.

In this way the said cables are securely fastened to the mast, but without interfering with the free movement of the cords 28, or liability of becoming entangled therewith.

The device above described is collapsed and carried on the airplane in the following manner.

First the plungers 40 are retracted, and the mast sections are telescoped. The bag is then gathered about the shortened mast and folded compactly in the manner well known to those skilled in the making of such apparatus.

The small parachute 50 is then folded in a similar manner over the end of the mast, and a jacket 53 (Fig. 7) is placed over the whole to protect it from the weather and to keep the wind caused by the progress of the plane through the air from opening either of the parachutes.

This jacket consists of a sack, or tube made of suitable fabric, approximately cylindrical in form and closed at one end as shown at 54. A ring 55 or other means of attachment for a cable is sewed or otherwise securely attached to the closed end of the jacket.

Said jacket is slit practically the length of one side as shown in Fig. 8, and the slit is normally closed by a multiple fastener 56 of well known type, and comprising a series of interengaging hooks, interlocking with each other and serving to maintain the slit closed. A runner 57 is provided to open and close the multiple fastener.

It is well understood that multiple fasteners of this type cannot be separated except progressively. In order for such fasteners to remain closed, however, it is necessary that both ends of the row of hooks be held in engagement by some outside means, since otherwise the flexibility of the material will allow the hooks under stress to disengage at the free end of the train. I guard against this contingency by providing a clamp 58 of spring material, and approximately C shape, which engages the first few hooks of the fastener and holds them securely together.

A cable 59 is fastened at one end to the runner 57, and at its other end to an eye-bolt 60, or other securing means, located on the airplane at a point partway between the saddle and the holding means 1. Owing to the connection of cable 59 with the fixed point 60, it will be apparent that rearward swinging movement of the parachute bundle will cause relative movement between the runner 57 and the fastener 56.

When the runner 57 is actuated to open the slit, it contacts with the clamp 58 at substantially the end of its travel, and disengages it from the hooks, thus opening the slit completely and freeing the jacket for instant removal from the parachute.

The parachute, folded and jacketed in this manner is swung down to a horizontal position, the neck 33 of the ball 32 passing down into the slot 17 in the shell 15 as shown in Fig. 8. The device is thus laid parallel to the wing or other horizontal surface of the airplane, and in a position to interfere as little as possible with the air stream flowing thereover.

In order to maintain said device in this position against the wind pressure caused by the travel of the airplane, a saddle, 61, made of suitable material, preferably light metal, and having a base 62 is attached to the airplane in a position to receive the free end of the folded parachute. The rear edge 63 of the saddle is preferably made somewhat lower than the front edge, as shown in Fig. 9, and a strap 64 of canvas or other suitable fabric is tightly stretched over the parachute bundle and securely fastened to the edges of the saddle with rivets 65 or other suitable holding means.

A multiple fastener 66 having a runner 67 at the end thereof farthest from the cockpit B and having a ring 68 thereon, is provided, traversing the strap adjacent the short edge 63 of the saddle, for the purpose of releasing the strap and the parachute when desired.

A spring clamp 69 is provided on one end of the fastener 66, identical in form and operation with clamp 58 above described. Another cable 70 fastened at one end in the ring 55 on the end of the jacket 53, passes, first through the ring 68 on the runner 67, and then to the cockpit of the airplane within easy reach of the pilot.

Having now described the construction and arrangement of parts of my device, I will proceed to outline its mode of operation.

Suppose the airplane to be out of control and falling in a "nose-dive" as shown in Fig. 1. In order to release the parachute and check the descent, all the pilot need do is to pull on the cable 70. Said cable in tightening will start runner 67 moving towards the opposite end of the fastener 66, or in the general direction of the ring 55. In its travel it will release the hooks of the fastener successively, until its encounters the clamp 69. The said clamp, under the impact of the runner will be disengaged from the hooks of the fastener and the runner will pass off the end of the series of hooks, and release the strap 64.

The parachute bundle, freed from the restraining action of the band 64 will then probably leave the saddle 61 under the influence of the air pressure upon it and start to swing around towards the rear of the aircraft as shown at F, Fig. 1.

If it fails to do this, a slight additional pull on the cable 70 will start it out of the saddle and swing it around approximately as shown, owing to the connection of said cable to the ring 55.

It will be understood, that the parachute bundle is perfectly free to swing in this manner, the socket member 15 (Fig. 3) turning easily in the base member 7 for this purpose.

It will now be apparent that said swinging movement of the parachute bundle will cause a tightening of the cable 59 (Fig. 7), and, since said cable is fastened at 60 to a rigid part of the airplane, said tightening will cause the runner 57, to move toward the clamp 58, and thus open the jacket.

This action is shown graphically at F, Fig. 1, and the swinging movement is intended to continue until the parachute bundle has assumed a position parallel to the line of travel of the airplane. The length of the fastener 56, and location of the fastening point 60, are such that, when the parts have reached this position the runner 57 will have completely opened the fastener 56, and released the spring clamp 58. The jacket 53 will thus be free from the bundle, and will be instantly carried away by the air stream rushing over the wing C.

In the event of the failure of any of these operations to take place automatically, they can be positively accomplished by the pilot. Thus, suppose the parachute bundle failed to swing further than shown at F, Fig. 1, a continued pull on the cable 70, shown in this view as slack, and carried back by the wind, will slip the jacket over the bundle, thus moving the fastener 56 relatively to the runner 57, and accomplishing the opening of the jacket in a positive manner.

Immediately the jacket is released, the wind will open the small parachute 50 and extend the mast 31, while the large parachute is unfolding therefrom and starting to fill with air. This action is graphically depicted at G, Fig. 1, and it is apparent that the parachutes, in a very short space of time will assume the condition shown in Fig. 2.

The purpose of the vents in the large parachutes can now be readily understood.

Figure 2:
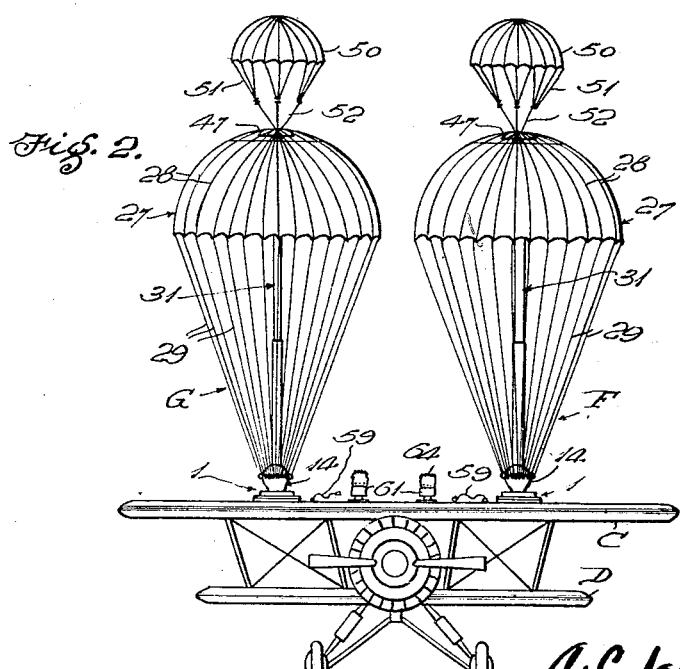
Fig. 2 is a vertical elevation of the same with the parachutes controlling the plane in its descent.

As above stated, a plurality of these parachute devices will preferably be used on each aircraft, and in my drawings, Fig. 2, I have shown three, one at F, one at G, and one at H.

In the situation shown, that of a nose dive, the pilot would first release parachutes A and C. As soon as these took effect they would retard the descent of the front portion of the airplane, so that the tail portion, continuing to fall, would quickly bring the airplane to horizontal position.

At the proper moment, before the airplane had quite reached this position the pilot would release parachute D, and thus prevent the tail from getting into a position below the wings, and keeping the airplane on an even keel. However, it will be readily appreciated that one or another of the devices would probably exert a retarding effect slightly greater or less than the others, and thereby cause a tilting of the airplane to the embarrassment of its occupants. Such a tilting would also introduce a strong probability of a disastrous landing.

It is in part to correct this difficulty that I have provided the parachutes with vents 30 and the means of controlling them. Thus, if one of the parachutes retards too much, thereby tilting the airplane from its normal position, it is only necessary to open the vent in that parachute sufficiently to cause it to lose a fraction of its lifting power, when the portion of the airplane affected will fall at a slightly increased rate, and the plane will regain its correct position.

By suitably controlling the vents it will be possible to maneuver the airplane during its descent so as to cause it to progress in falling towards a selected landing place.

Another important function of the vents is that of reducing the shock to the whole mechanism at the instant the parachutes open.

Thus all the vents would be wide open when the parachutes were going into action, but as soon as the velocity of the fall had been checked to a certain extent the vents would be gradually closed, thereby gaining the full benefit from the capacity of the parachutes and checking the fall still more.

There is another advantage which is inherent in my device and that is the capability of making it of relatively heavy and durable material.

The conventional type of aviator's parachute is folded into a compact bundle and strapped to the man's back. For this reason it must be made of very light and thin material, since otherwise when packed it would be too bulky, heavy, and cumbersome. Since my device is attached to the airplane and not the aviator, it need not be so light and readily portable, and since it has available the whole top of the airplane for packing, it need not be so compactly folded as is the case with the device now in use.

My parachute may thus be made of linen, light canvas, or similar material and will be therefore less likely to rip when in use, or rot with age than it would if made of silk or the like.

The greatest advantage of my device, however, is the fact that it operates to control the descent of the disabled airplane and not the occupants merely. This is a great advantage in case inexperienced persons are in the airplane, since it is likely that they would be very reluctant to jump and use their parachutes in case of necessity, and would doubtless stay in the ship and take their chances.

It is thus apparent that I have designed a new and useful parachute which will lower an airplane safely to the ground, which may be controlled in its descent and which will not cause the plane to spin. Although I have shown my device as applied to a small airplane, it is of course applicable to much larger ones, or to any type of aircraft, and I do not wish to be limited to any specific structure or application of my device except as defined by the appended claims.

What I claim is:

1. In a parachute for use on aircraft, a bag, a mast, having a funnel-shaped top, a central opening in said bag, cords radially disposed on said bag and meeting at a point in said opening, and means for pulling said cords into said funnel shaped top.

2. In a parachute for use on aircraft, an air holding part, an opening in said air holding part, reenforcing cords radially disposed on said air holding part and meeting at a point in said opening, stabilizing means for said parachute including a hollow mast having a funnel shaped top, and a cable passing through said mast and fastened to said reenforcing cords.

3. In a parachute for use on aircraft, a part spherical air holding part, a circular opening in the center of the surface of said air holding part, reinforcing cords disposed on said air holding part in spaced relation, and meeting at a point in the center of said opening, fastening means in said opening, a hollow mast having a funnel shaped top disposed adjacent said opening, and a cable passing through said mast and secured to said fastening means whereby said cords may be pulled down inside said mast to close said opening.

4. In a parachute for use on aircraft, a socket member rotatably mounted on said aircraft, an air holding part having an opening therein, cords attached to said air holding part, and to said socket member, a ball held in said socket, and a mast rigidly secured to said ball.

5. In combination with an airplane, a parachute, an enclosing jacket therefor, an opening in said jacket, a quick releasable closing device for said opening, and means operable by a swinging movement of said parachute relative to said airplane for releasing said parachute.

6. In combination with an airplane, a parachute, swingingly mounted on a part of said airplane, holding means for one end of said parachute mounted on said part, retaining means for said parachute on said holding means, a quick releasing fastener on said retaining means, a jacket for said parachute, an opening in said jacket, a quick releasing fastener for said opening, and a cable for successively releasing said first-named fastener, swinging said parachute, and releasing said second named fastener, substantially as described.

In testimony whereof, I affix my signature.

ALBERT CASPER JENEZON.